US009319684B2

(12) United States Patent
Karczewicz et al.

(10) Patent No.: US 9,319,684 B2
(45) Date of Patent: Apr. 19, 2016

(54) ALTERNATIVE TRANSFORM IN SCALABLE VIDEO CODING

(71) Applicant: QUALCOMM Incorporated, San Diego, CA (US)

(72) Inventors: Marta Karczewicz, San Diego, CA (US); Liwei Guo, San Diego, CA (US); Xiang Li, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 13/969,406

(22) Filed: Aug. 16, 2013

(65) Prior Publication Data

US 2014/0056361 A1  Feb. 27, 2014

Related U.S. Application Data

(60) Provisional application No. 61/691,727, filed on Aug. 21, 2012, provisional application No. 61/697,198, filed on Sep. 5, 2012, provisional application No. 61/699,120, filed on Sep. 10, 2012, provisional application No. 61/707,833, filed on Sep. 28, 2012.

(51) Int. Cl.
*H04N 11/02* (2006.01)
*H04N 19/60* (2014.01)
(Continued)

(52) U.S. Cl.
CPC ......... *H04N 19/00775* (2013.01); *H04N 19/12* (2014.11); *H04N 19/157* (2014.11); *H04N 19/17* (2014.11); *H04N 19/60* (2014.11); *H04N 19/30* (2014.11)

(58) Field of Classification Search
USPC ........................................ 375/240.01–240.29
See application file for complete search history.

(56) References Cited

U.S. PATENT DOCUMENTS

| 2003/0138160 A1* | 7/2003 | Ishikawa | H04N 19/86 382/260 |
| 2006/0153292 A1* | 7/2006 | Liang | H04N 19/176 375/240.2 |
| 2006/0176957 A1* | 8/2006 | Han | H04N 19/52 375/240.16 |

(Continued)

FOREIGN PATENT DOCUMENTS

| WO | WO-2008157360 A2 | 12/2008 |
| WO | 2012167712 A1 | 12/2012 |

OTHER PUBLICATIONS

Saxena et al., "Jointly optimal intra prediction and adaptive primary transform", 3. JCT-VC Meeting; 94. Mpeg Meeting; Oct. 7, 2010-Oct. 15, 2010; Guangzhou; (Joint Collaborative Team on Video Coding of ISO /IECJTC1/SC29/WG11 and ITU-T 56.16); URL: http://wftp3.itu.int/av-arch/jctvc-site/, No. JCTVC-C108, Oct. 2, 2010 (2010-18-82), XP030007815; pp. 1-21.

(Continued)

*Primary Examiner* — Leron Beck
(74) *Attorney, Agent, or Firm* — Knobbe, Martens, Olson & Bear, LLP

(57) ABSTRACT

An apparatus for coding video data according to certain aspects includes a memory and a processor in communication with the memory. The memory stores video block information. The video block information includes reference layer block information. The processor determines, based on a parameter of the video block information, a transform function that may be used to code the video block information. The processor may encode or decode the video block information. The transform function may be an alternative transform when the parameter is a predetermined value and a primary transform when the parameter is not the predetermined value. The alternative transform includes one of: a discrete-sine-transform (DST), a Type-I DST, a Type-III DST, a Type-IV DST, a Type-VII DST, a discrete-cosine-transform (DCT), a DCT of different types, and a Karhunen-Loeve transform (KLT).

42 Claims, 7 Drawing Sheets

(51) Int. Cl.
*H04N 19/12* (2014.01)
*H04N 19/157* (2014.01)
*H04N 19/17* (2014.01)
*H04N 19/30* (2014.01)

(56) References Cited

U.S. PATENT DOCUMENTS

| | | | |
|---|---|---|---|
| 2006/0233250 A1* | 10/2006 | Cha | H04N 19/105 375/240.12 |
| 2007/0291836 A1 | 12/2007 | Shi et al. | |
| 2008/0219354 A1 | 9/2008 | Segall et al. | |
| 2008/0310512 A1 | 12/2008 | Ye et al. | |
| 2010/0040136 A1* | 2/2010 | Sabo | H03M 7/4006 375/240.02 |
| 2010/0046622 A1 | 2/2010 | Doser et al. | |
| 2011/0170592 A1 | 7/2011 | Kim et al. | |
| 2013/0101014 A1* | 4/2013 | Fu | H04N 19/12 375/240.1 |

OTHER PUBLICATIONS

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); < URL: http://wftp3.itu.int/av-arch/jctvc-site/no.jvtcv-k0036 >, Oct. 2, 2012, XP030112968, pp. 1-22.

Han W.J., et al., "Technical description of Samsung proposal for SVC CE1", 70. MPEG Meeting; Palma de Mallorca; (MotionPicture Expert Group or ISO/IEC JTC1/SC29/WG11), No. M11277, Oct. 13, 2004, XP030040051, ISSN: 0000-0106; pp. 1-15.

International Search Report and Written Opinion—PCT/US2013/055603—ISA/EPO—Nov. 11, 2013.

Rath G et al., "Improved prediction & transform for spatial scalability", 20. JVT Meeting; 77. MPEG Meeting; Klagenfurt, AT; (Joint Video Team of ISO/IEC JTC1/SC29/WG11 and ITU-TSG.16), No. JVT-T082, Jul. 16, 2006, XP030006569, ISSN: 0000-0408; pp. 1-4.

Van Wallendael G., et al., "Transform skipping dependent on block parameters", 7. JCT-VC Meeting; 98. MPEG Meeting; Nov. 21, 2011-Nov. 30, 2011; Geneva; (Joint Collaborative Team on Video Cooing of ISO/IEC JTC1/SC29/WG11 and ITU-T SG.16) ; URL: http://wftp3.itu.int/av-arch/jctvc-site/, No. JCTVC-G577. Nov. 8, 2011. XP030110561, pp. 1-11.

\* cited by examiner

ALTERNATIVE TRANSFORM IN SCALABLE VIDEO CODING

CROSS-REFERENCE TO RELATED APPLICATIONS

This application claims priority to U.S. Provisional No. 61/691,727, filed Aug. 21, 2012, U.S. Provisional No. 61/697,198, filed Sep. 5, 2012, U.S. Provisional No. 61/699,120, filed Sep. 10, 2012, and U.S. Provisional No. 61/707,833, filed Sep. 28, 2012, each of which are incorporated by reference in their entireties.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Some block-based video coding and compression makes use of scalable techniques. Scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. In some cases, the base layer may be transmitted in a manner that is more reliable than the transmission of enhancement layers.

SUMMARY

In one embodiment, an apparatus is provided for encoding or decoding video information. The apparatus comprises a memory unit configured to store video information associated with a base layer and an enhancement layer. The apparatus further comprises a processor operationally coupled to the memory unit. The processor is configured to encode or decode the video block information using a transform function determined by a threshold value related to a difference between the video block information and a neighboring video block information.

In one embodiment, an apparatus configured to code video information includes a memory and a processor. The memory is configured to store video block information associated with an enhancement layer. The processor is operationally coupled to the memory and is configured to retrieve the video block information from the memory and code the video information, the processor further configured to determine a transform function based upon a parameter of the video block information; and code the video block information using the determined transform function.

In another embodiment, the parameter of the video block information comprises a coding mode. In another embodiment, the coding mode comprises an Intra base layer (Intra BL) mode or Generalized Residual Prediction (GRP). In another embodiment, to determine the transform function the processor is configured to: determine whether the parameter of the video block information is a predetermined value; and in response to determining that the parameter of the video block information is not the predetermined value, determine that the transform function is a primary transform; or in response to determining that the parameter of the video block information is the predetermined value, determine that the transform function is an alternative transform. In another embodiment, the alternative transform includes one of: a discrete-sine transform (DST), a Type-I DST, a Type-III DST, a Type-IV DST, a Type-VII DST, a discrete-cosine-transform (DCT), a DCT of different types, and a Karhunen-Loeve transform (KLT). In another embodiment, the parameter of the video information is signaled at one of: a frame level, a slice level, a coding unit level, and a transform block unit level. In another embodiment, the parameter of the video information comprises at least one of: side information, a coding unit size, a transform unit size, a frame type, a frame size, a quantization parameter (QP), temporal layer information, and parsed residue coefficients information. In another embodiment, the parameter comprises information from a base layer. In another embodiment, the parameter of the video block information comprises a threshold value related to a difference between the video block information and neighboring video block information. In another embodiment, the transform function comprises a non-cosine based transform when the difference between the video block information and the neighboring block information falls below the threshold value. In another embodiment, the transform function comprises a cosine transform when the difference between the video block information and the neighboring block information falls above the threshold value. In another embodiment, the processor is configured to receive the threshold value using a high level syntax or encoded as a flag. In another embodiment, the determined transform is signaled using binarization. In another embodiment, the binarization comprises at least one of: a truncated unary code and a fixed length code. In another embodiment, the apparatus comprises an encoder. In another embodiment, the apparatus comprises a decoder. In another embodiment, the apparatus is selected from a group consisting of one or more of: a desktop computer, a notebook computer, a laptop computer, a tablet computer, a set-top box, a telephone handset, a smart phone, a smart pad, a television, a camera, a display device, a digital media player, a video gaming console, and a video streaming device.

In another embodiment, a method of encoding video information includes receiving video block information associated with a reference layer; determining a transform function based upon a parameter of the video block information; and encoding the video block information using the determined transform function.

In another embodiment, a method of decoding video information includes receiving video block information associated with a reference layer; determining a transform function based upon a parameter of the video block information; and decoding the video block information using the determined transform function.

In another embodiment, a video coding device is configured to code video data, and the video coding device includes means for determining a transform function based upon a parameter of video block information associated with a reference layer; and means for coding the video block information using the determined transform function.

In yet another embodiment, a non-transitory computer readable medium includes code that when executed causes an apparatus to determine a transform function based upon a parameter of video block information associated with a reference layer; and code the video block information using the transform.

DETAILED DESCRIPTION

Figure 1:
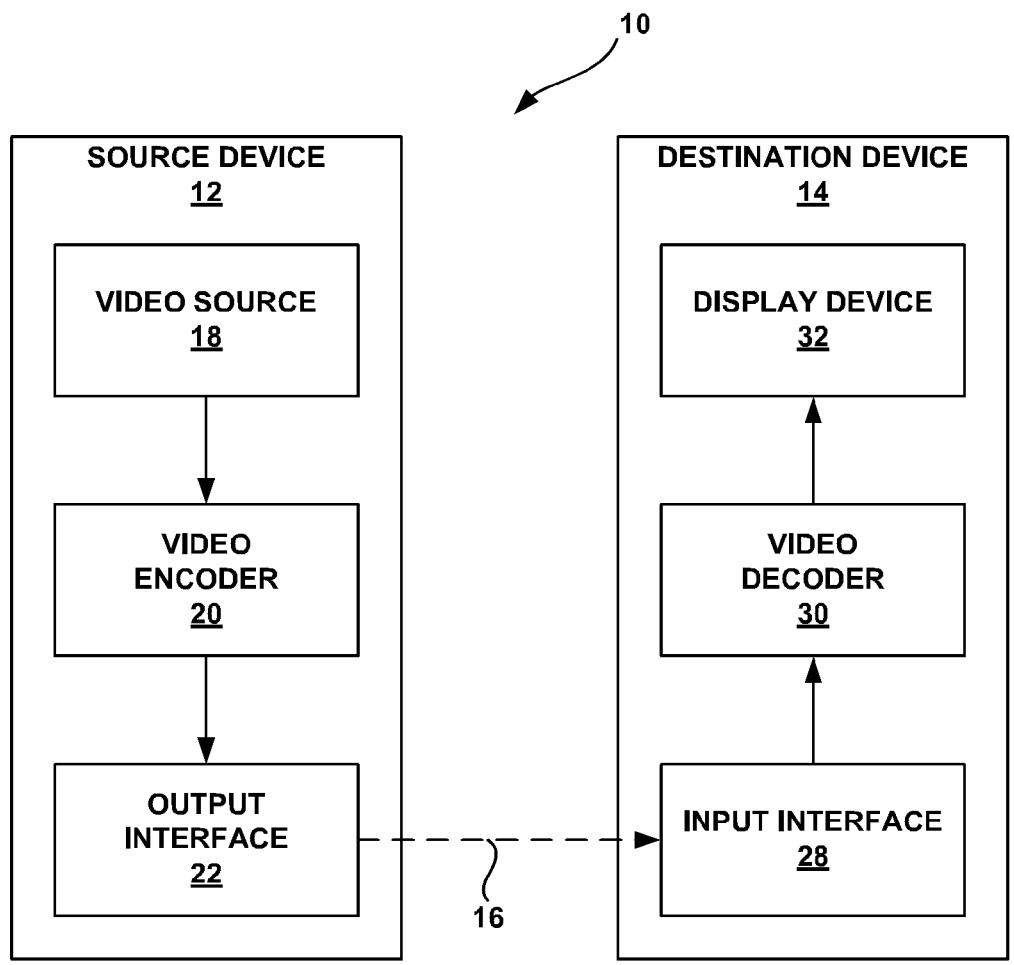
FIG. 1 is a block diagram illustrating an example video encoding and decoding system that may utilize techniques in accordance with aspects described in this disclosure.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

A digital image, such as a video image, a TV image, a still image or an image generated by a video recorder or a computer, may consist of pixels arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

The techniques described in this disclosure generally relate to scalable video coding (SVC) and 3D video coding. For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as a base layer, and a higher level layer such as an enhanced or enhancement layer, etc.). It should be understood that the examples described in this disclosure can be extended to examples with multiple base layers and enhancement layers as well.

In general, video coding standards can include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and Multiview Video Coding (MVC) extensions. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, referred to as HEVC WD10 hereinafter, is available from http://phenix.int-evry.fr/jct/doc_end_user/documents/12_Geneva/wg11/JCTVC-L1003-v34.zip. The full citation for the HEVC WD10 is document JCTVC-L1003_v34, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, is also being developed by the JCT-3V. The latest MV-HEVC draft specification, referred to as MV-HEVC WD3 hereinafter, is downloadable from http://phenix.it-sudpans.eu/jct2/doc_end_user/documents/3_Geneva/wg11/JCT3V-C1004-v4.zip. The scalable extension to HEVC, named SHVC, is also being developed by the JCT-VC. A recent Working Draft (WD) of SHVC, referred to as SHVC WD 1 hereinafter, is available from http://phenix.int-evry.fr/jct/doc_end_user/documents/12_Geneva/wg11/JCTVC-L1008-v1.zip.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

Scalable video coding (SVC) may be used to provide quality (also referred to as signal-to-noise (SNR)) scalability, spatial scalability (e.g., resolution scaling), and/or temporal scalability (e.g., frame rate scaling). For example, in one embodiment, a reference layer (e.g., a base layer) includes video information sufficient to display a video at a first quality level and an enhancement layer includes additional video information relative to the reference layer such that the reference layer and the enhancement layer together include video information sufficient to display the video at a second quality level higher than the first level (e.g., less noise, greater resolution, better frame rate, etc.). An enhancement layer may have a different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In inter-layer residual prediction, the residue of the base layer may be used to predict the current block in the enhancement layer. The residue may be defined as the difference between the temporal prediction for a video unit and the source video unit. In residual prediction, the residue of the base layer is also considered in predicting the current block. For example, the current block may be reconstructed using the residue from the enhancement layer, the temporal prediction from the enhancement layer, and/or the residue from the base layer. The current block may be reconstructed according to the following equation:

$$\hat{I}_e = r_e + P_e + r_b \qquad (1)$$

where $\hat{I}_e$ denotes the reconstruction of the current block, $r_e$ denotes the residue from the enhancement layer, $P_e$ denotes the temporal prediction from the enhancement layer, and $r_b$ denotes the residue prediction from the base layer.

In order to use inter-layer residual prediction for a macroblock ("MB") in the enhancement layer, the co-located macroblock in the base layer should be an inter MB, and the residue of the co-located base layer macroblock may be up-sampled according to the spatial resolution ratio of the enhancement layer (e.g., because the layers in SVC may have different spatial resolutions). In inter-layer residual prediction, the difference between the residue of the enhancement layer and the residue of the up-sampled base layer may be coded in the bitstream. The residue of the base layer may be normalized based on the ratio between quantization steps of base and enhancement layers.

SVC extension to H.264 provides single-loop decoding for motion compensation in order to maintain low complexity for the decoder. In general, motion compensation is performed by adding the temporal prediction and the residue for the current block as follows:

$$\hat{I} = r + P \qquad (2)$$

where $\hat{I}$ denotes the current frame, r denotes the residue, and P denotes the temporal prediction. In single-loop decoding, each supported layer in SVC can be decoded with a single motion compensation loop. In order to achieve this, all blocks that are used to inter-layer intra predict higher blocks are coded using constrained intra-prediction. In constrained intra prediction, intra mode MBs are intra-coded without referring to any samples from neighboring inter-coded MBs. On the other hand, HEVC allows multi-loop decoding for SVC, in which an SVC layer may be decoded using multiple motion compensation loops. For example, the base layer is fully decoded first, and then the enhancement layer is decoded.

Residual prediction formulated in Equation (1) may be an efficient technique in H.264 SVC extension. However, its performance can be further improved in HEVC SVC extension, especially when multi-loop decoding is used in HEVC SVC extension.

In the case of multi-loop decoding, difference domain motion compensation may be used in place of residual prediction. In SVC, an enhancement layer may be coded using pixel domain coding or difference domain coding. In pixel domain coding, the input pixels for an enhancement layer pixels may be coded, as for a non-SVC HEVC layer. On the other hand, in difference domain coding, difference values for an enhancement layer may be coded. The difference values may be the difference between the input pixels for the enhancement layer and the corresponding scaled base layer reconstructed pixels. Such difference values may be used in motion compensation for difference domain motion compensation.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer predicted samples.

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12.

Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., GOPs. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular, etc.) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision, etc.), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be co-located with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
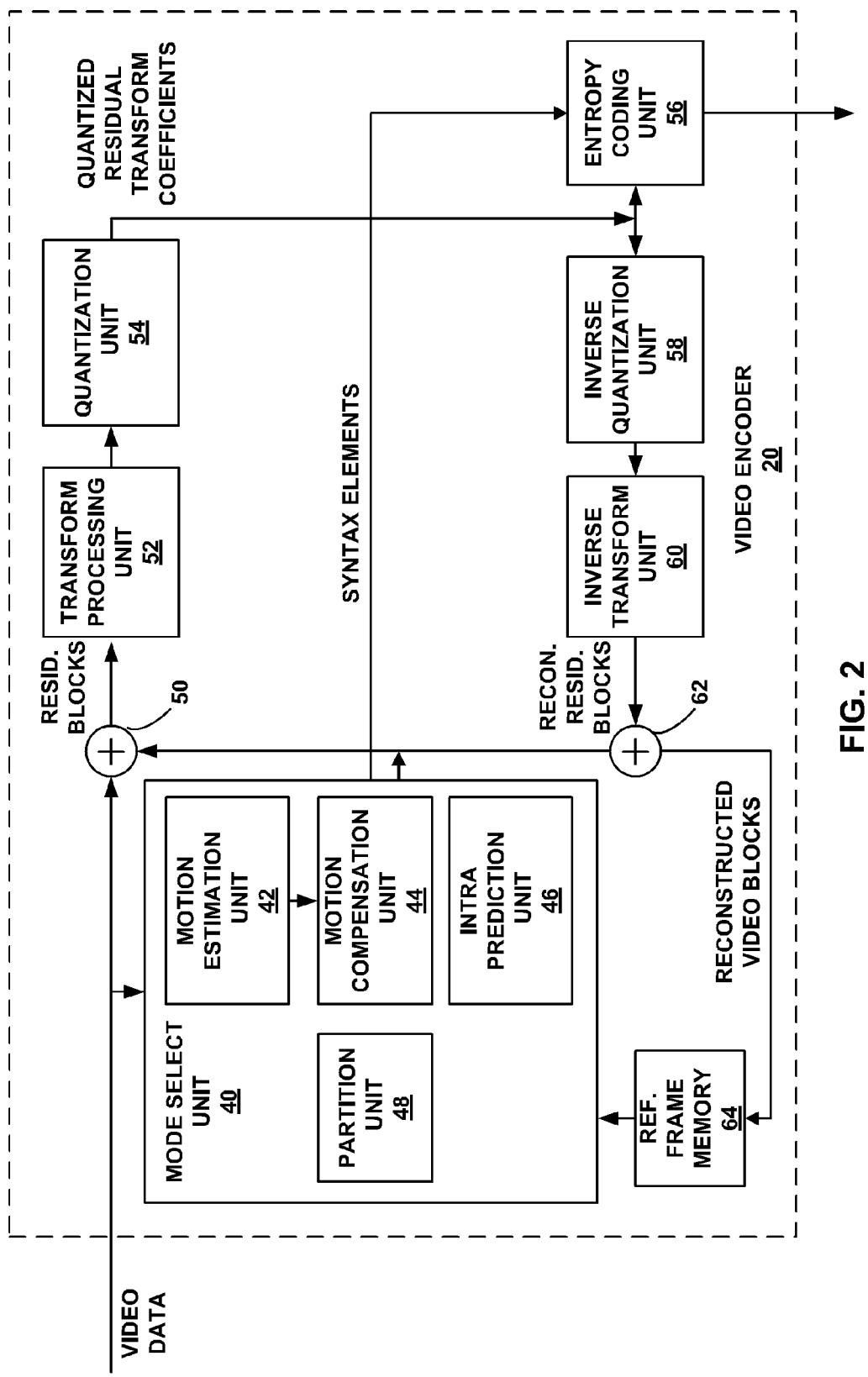
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In another embodiment, not shown, a filter module may receive the reconstructed video block from the summer 62. The filter module may perform a deblocking operation to reduce blocking artifacts in the video block associated with the CU. After performing the one or more deblocking operations, the filter module may store the reconstructed video block of the CU in decoded picture buffer. The motion estimation unit 42 and the motion compensation unit 44 may use a reference picture that contains the reconstructed video block to perform inter prediction on PUs of subsequent pictures. In addition, the intra prediction unit 46 may use reconstructed video blocks in the decoded picture buffer to perform intra prediction on other PUs in the same picture as the CU. Thus, after the filter module applies a deblocking filter to the samples associated with an edge, a predicted video block may be generated based at least in part on the samples associated with the edge. The video encoder 20 may output a bitstream that includes one or more syntax elements whose values are based at least in part on the predicted video block.

Figure 3:
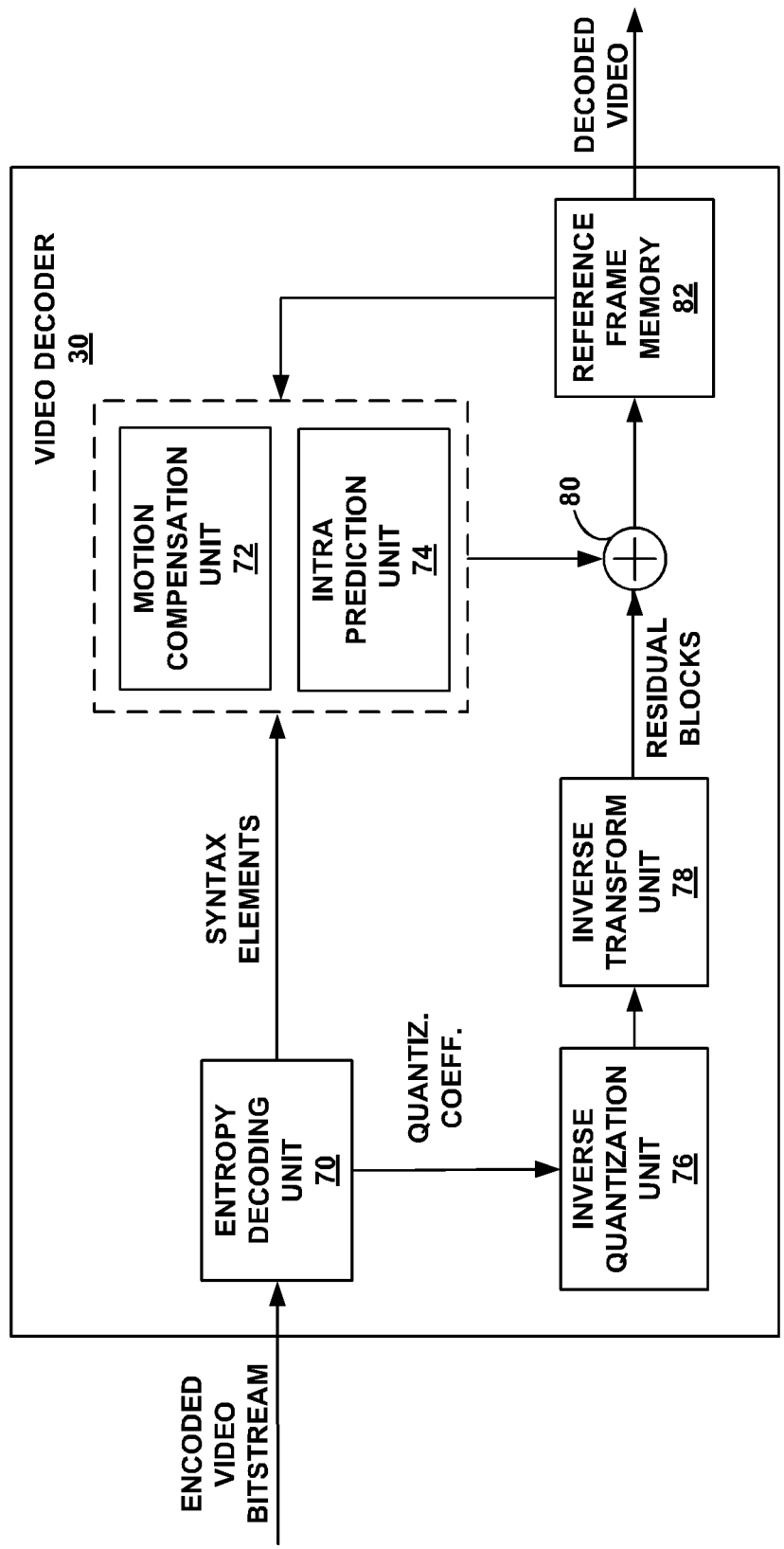
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de quantizes, the quantized transform coefficients provided in the bitstream and decoded by entropy decoding unit 70. The inverse quantization process may include use of a quantization parameter (QP) Y calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference frame memory 82 also stores decoded video for later presentation on a display device, such as display device 32 of FIG. 1.

In another embodiment, not shown, after the summer 80 reconstructs the video block of the CU, a filter module may perform a deblocking operation to reduce blocking artifacts associated with the CU. After the filter module performs a deblocking operation to reduce blocking artifacts associated with the CU, the video decoder 30 may store the video block of the CU in a decoded picture buffer. The decoded picture buffer may provide reference pictures for subsequent motion compensation, intra prediction, and presentation on a display device, such as display device 32 of FIG. 1. For instance, the video decoder 30 may perform, based on the video blocks in the decoded picture buffer, intra prediction or inter prediction operations on PUs of other CUs.

In a typical video encoder, the frame of the original video sequence is partitioned into rectangular regions or blocks, which are encoded in Intra-mode (I-mode) or Inter-mode (P-mode). The blocks are coded using some kind of transform coding, such as DCT coding. However, pure transform-based coding may only reduce the inter-pixel correlation within a particular block, without considering the inter-block correlation of pixels, and may still produce high bit-rates for transmission. Current digital image coding standards may also exploit certain methods that reduce the correlation of pixel values between blocks.

In general, blocks encoded in P-mode are predicted from one of the previously coded and transmitted frames. The prediction information of a block may be represented by a two-dimensional (2D) motion vector. For the blocks encoded in I-mode, the predicted block is formed using spatial prediction from already encoded neighboring blocks within the same frame. The prediction error (e.g., the difference between the block being encoded and the predicted block) may be represented as a set of weighted basis functions of some discrete transform. The prediction error may also be referred to as residual data. The transform is typically performed on an 8×8 or 4×4 block basis. The weights (e.g., transform coefficients) are subsequently quantized. Quantization introduces loss of information and, therefore, quantized coefficients have lower precision than the originals.

Quantized transform coefficients, together with motion vectors and some control information, may form a complete coded sequence representation and are referred to as syntax elements. Prior to transmission from the encoder to the decoder, all syntax elements may be entropy coded so as to further reduce the number of bits needed for their representation.

In the decoder, the block in the current frame may be obtained by first constructing the block's prediction in the same manner as in the encoder and by adding to the prediction the compressed prediction error. The compressed prediction error may be found by weighting the transform basis functions using the quantized coefficients. The difference between the reconstructed frame and the original frame may be called reconstruction error.

In H.264/AVC, a video frame or slice is partitioned into square blocks of size 16×16 for encoding and decoding. Such blocks are called macroblocks. In the current high efficiency video coding (HEVC), a video frame or slice is partitioned into square blocks of variable sizes for encoding and decoding. Such blocks may be called coding units or CUs in HEVC. For example, the size of a CU may be 64×64, 32×32, 16×16 or 8×8. Unlike a macroblock, a larger size CU can be split into a number of smaller size CUs. A non-split CU and a macroblock are similar to each other in terms of their concept and functionality.

Once a macroblock or a non-split CU is determined, the block can be further split into a number of partitions for prediction. Such a partition may also be referred as prediction unit or PU in HEVC.

Scalable Video Coding

Figure 4:
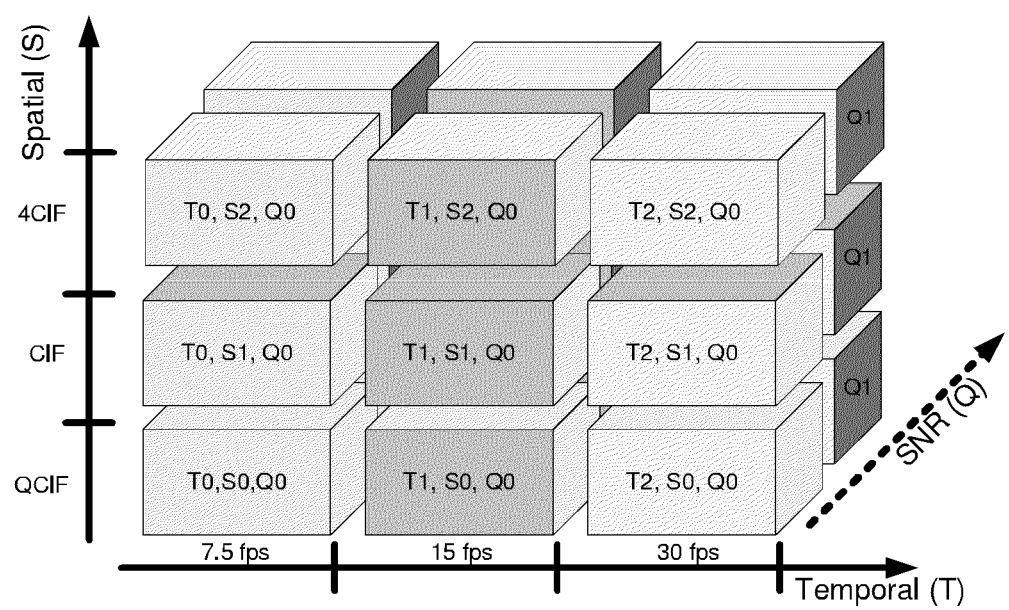
FIG. 4 is a block diagram illustrating scalabilities in three different dimensions according to aspects of this disclosure.

An example of scalabilities in different dimensions is shown in FIG. 4. In the example, scalabilities are enabled in three dimensions. In a time dimension, frame rates with 7.5

Hz, 15 Hz or 30 Hz can be supported by temporal scalability (T). When spatial scalability (S) is supported, different resolutions such as QCIF, CIF and 4CIF are enabled. For each specific spatial resolution and frame rate, the SNR (Q) layers can be added to improve the picture quality. Once video content has been encoded in such a scalable way, an extractor tool may be used to adapt the actual delivered content according to application requirements, which are dependent e.g., on the clients or the transmission channel. In the example shown in FIG. 4, each cubic contains the pictures with the same frame rate (temporal level), spatial resolution and SNR layers. Better representation can be achieved by adding those cubes (pictures) in any dimension. Combined scalability is supported when there are two, three or even more scalabilities enabled.

According to one SVC implementation, the pictures with the lowest spatial and quality layer are compatible with H.264/AVC. The pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. SNR scalability is also referred as quality scalability. Each spatial or SNR enhancement layer itself may be temporally scalable, with the same temporal scalability structure as the H.264/AVC compatible layer. For one spatial or SNR enhancement layer, the lower layer it depends on is also referred as the base layer of that specific spatial or SNR enhancement layer.

Figure 5:
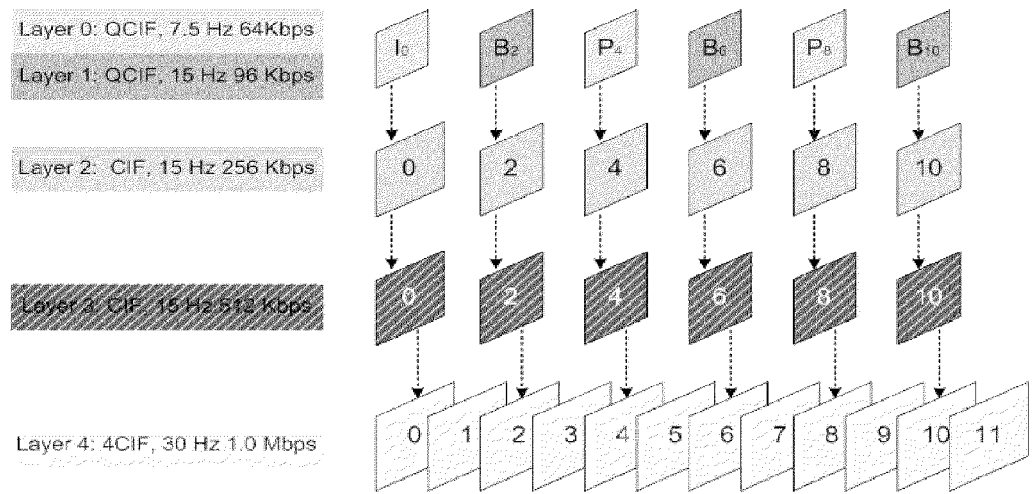
FIG. 5 is a block diagram illustrating an example structure of an SVC bitstream according to aspects of this disclosure.

An example of an SVC coding structure is shown in FIG. 5. The pictures with the lowest spatial and quality layer (pictures in layer 0 and layer 1, with QCIF resolution) are compatible with H.264/AVC. Among them, those pictures of the lowest temporal level form the temporal base layer, as shown in layer 0 of FIG. 5. This temporal base layer (layer 0) can be enhanced with pictures of higher temporal levels (layer 1). In addition to the H.264/AVC compatible layer, several spatial and/or SNR enhancement layers can be added to provide spatial and/or quality scalabilities. For instance, the enhancement layer can be a CIF representation with the same resolution as layer 2. In this example, layer 3 is a SNR enhancement layer. As shown in the example, each spatial or SNR enhancement layer itself may be temporally scalable, with the same temporal scalability structure as the H.264/AVC compatible layer. Also, an enhancement layer can enhance both spatial resolution and frame rate. For example, layer 4 provides a 4CIF enhancement layer, which further increases the frame rate from 15 Hz to 30 Hz.

Figure 6:
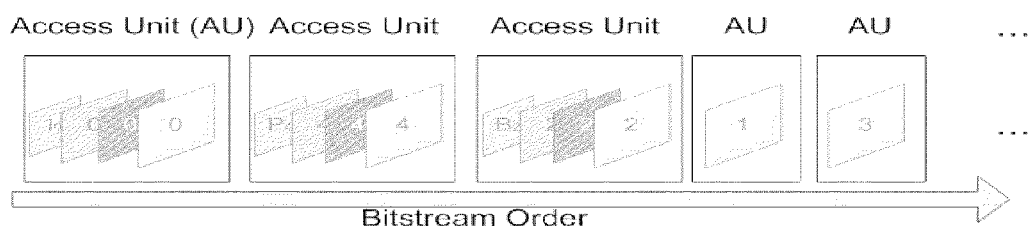
FIG. 6 is a block diagram illustrating example SVC access units in a bitstream according to aspects of this disclosure.

As shown in FIG. 6, the coded slices in the same time instance are successive in the bitstream order and form one access unit in the context of SVC. Those SVC access units then follow the decoding order, which could be different from the display order and decided e.g., by the temporal prediction relationship.

Figure 7:
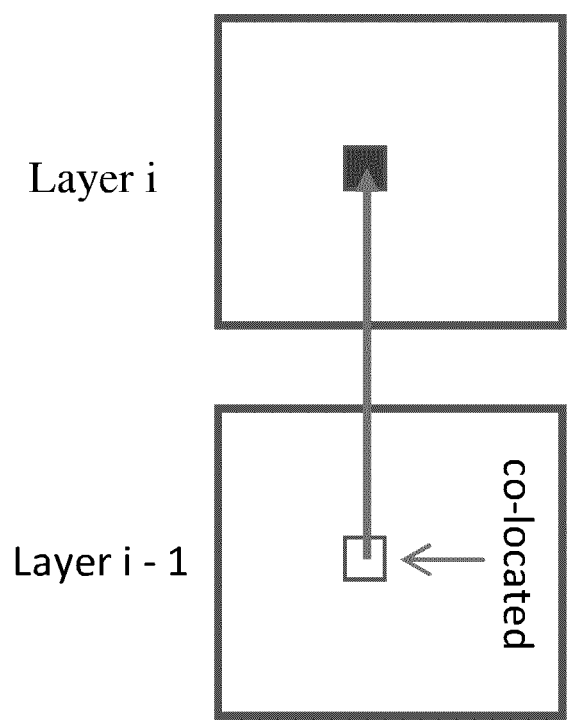
FIG. 7 is a conceptual diagram showing a current block in an enhancement layer and a co-located block in a corresponding reference or base layer, as used during Intra BL mode.

In scalable coding, there is a special coding mode for enhancement layer called "Intra BL mode." In Intra BL mode, the texture in a block is predicted using the texture of the corresponding blocks in base layer. An example is illustrated in FIG. 7. The block in base layer may need upsampling if the enhancement image has a larger size than the base layer image. The prediction error (which is called residue) may be transformed, quantized and entropy encoded.

Generalized residual prediction ("GRP") is an inter mode for scalable video coding, where a weighting factor is used to reconstruct the current picture. In one embodiment, GRP can be expressed as:

$$\hat{I}_c = r_c + P_c + w \cdot r_r,$$

where $\hat{I}_c$ denotes the reconstruction of the current frame in the current layer, $P_c$ represents the temporal prediction from the same layer, $r_r$ is the residual prediction from reference layer, and w is a weighting factor which needs to be coded in bitstream or derived based on previously coded information. Note that this framework can be applied in cases of both single-loop decoding and multi-loop decoding.

In the scenario of multi-loop decoding, GRP can be further depicted as $$\hat{I}_c = r_c + P_c + w \cdot (\hat{I}_r - P_r),$$

where $P_r$ indicates the temporal prediction for the current picture in the reference layer, $\hat{I}_r$ denotes the full reconstruction of the current picture in the reference layer.

During video coding, residues are transformed. Typically, discrete-cosine-transform ("DCT") is used to perform the transform. However, the characteristics of Intra BL block and GRP block residues may be different from other block types. Hence, DCT may not be the best choice in terms of coding efficiency. In accordance with certain embodiments, using alternative transforms for Intra BL block coding and GRP block coding is desirable as further detailed below.

Alternative Transforms

In a video encoder, such as video encoder 20 of FIG. 2, or a video decoder, such as video decoder 30 of FIG. 3, a primary transform may be used in most block coding modes. For example, for regular inter coded blocks (regardless of motion vector values, prediction directions, uni-prediction or bi-prediction) and lossless coding mode, primary transform DCT is used to encode the residues. According to this embodiment, a transform different from the primary transform (e.g., an alternative transform, such as one of the alternative transforms described herein) may be used for Intra BL block coding and GRP block coding.

Discrete Sine Transform

One alternative transform for Intra BL block and GRP block can be discrete-sine-transform (DST). There are different types of DST transforms. In one example, Type-I DST may be used for Intra BL mode. In another example, Type-III DST may be used for Intra BL mode and GRP mode. In yet another example, Type-VII DST (which is used for HEVC intra prediction) can also be used for Intra BL. In yet another example, Type-IV DST can also be used for Intra BL.

The following are formula for some of these example DST transforms:

(N-point):

$$X_k = \sum_{n=0}^{N-1} x_n \sin\left[\frac{\pi}{N+1}(n+1)(k+1)\right] \quad \text{Type-I}$$

(N-point):

$$X_k = \sum_{n=0}^{N-1} x_n \sin\left[\frac{\pi}{N}\left(n+\frac{1}{2}\right)(k+1)\right] \quad \text{Type-II}$$

(N-point):

$$X_k = \frac{(-1)^k}{2} x_{N-1} + \sum_{n=0}^{N-2} x_n \sin\left[\frac{\pi}{N}(n+1)\left(k+\frac{1}{2}\right)\right] \quad \text{Type-III}$$

The transform used for Intra BL can be variations of the above standard DST. For example, the used transform can be an integer version of DST so the possible mismatch from floating point implementation can be removed.

Adaptive Transform

In this embodiment, the Intra BL can use DCT, DCT of different types, DST, DST of different types, KLT or some other transforms. The selection of the transform for Intra BL mode and GRP block can be adaptive.

For example, in some embodiments, the selection can be pre-defined and known to both the video encoder 20 and the video decoder 30, or the selection can be user-defined and signaled to the decoder. The signal can be at the frame level, slice level, CU level or TU level. In one example, a flag is transmitted at the CU level. If the flag=1, DST is used for all the transforms in this CU. If the flag=0, DCT is used for all the transforms in this CU. In another example, the flag is only transmitted for certain CU mode(s). For example, only for a CU encoded as Intra BL mode or GRP mode with non-zero weighting, a flag is transmitted for the CU. In yet another example, this flag is only transmitted for certain CU sizes. For example, it is only transmitted for CU with size larger than a threshold. In yet another example, this flag is only transmitted for certain CU mode with certain CU sizes. For example, it is only transmitted for Intra BL CU or GRP CU with size >=N× N. In yet another example, this flag is transmitted for a CU, but it only selects the transform for TU size larger than a threshold in this CU. For CU smaller than this threshold, DST or DCT is always used.

The transform selection (including the applied modes and the threshold size described above) can be adaptively determined based on side information like CU size, TU size, frame type, frame size, QP, temporal layer information, parsed residue coefficients information (e.g., position of last non-zero coefficient, number of non-zero coefficients, amplitude of coefficients, etc.).

The selection can also be based on information from the base layer or information from both the enhancement layer and the base layer. For example, the selection can be based on the QP of enhancement layer and/or the QP of base layer and/or the difference (or ratio) between the QP of enhancement layer and the QP of base layer. Similarly, the selection can be based on the frame size/rate of enhancement layer and the base layer.

The selection can also be based on the corresponding block in base layer, Blk_BL. For example, the selection can be based on the pixel characteristics of Blk_BL. The pixel characteristics can be (for example) a direction of the texture, an amplitude of pixels, a mean of pixel values, a variance of pixel values, and a gradient direction/value of Blk_BL. The selection can also be based on the coding mode of Blk_BL, for example, whether Blk_BL is intra-, inter-, or Skip mode, the intra prediction, etc. The selection can also be derived by testing different transforms on Blk_BL and select the one that gives best performance (for example, best energy compaction property) at Blk_BL.

Additional Block Modes

In some embodiments, the Intra BL transform methods described above can be extended to other block modes, including, but not limited to, generalized residue prediction mode.

Neighboring Regions

In one embodiment, a coder (e.g., video encoder 20 and/or video decoder 30) determines a transform block at an enhancement layer, BLK_EL, and a corresponding block at a base layer BLK_BL (e.g., a co-located block located at the same or a scaled position within the base layer). A Neigh_EL may define a neighboring region of BLK_EL, and a Neigh_BL may define the corresponding neighboring region of BLK_BL. The selection of the transform for BLK_EL is based on Neigh_EL and Neigh_BL. For example, if the difference of DC between Neigh_EL and Neigh_BL is larger than a threshold, DCT may be used, otherwise DST may be used. The threshold can be transmitted using high level syntax or can be adaptive on side information as described in some other embodiments herein. In another embodiment, the transform selection can be encoded as a flag (e.g., using CABAC coding), and the context index can be adaptively determined based on Neigh_EL and Neigh_BL. A detailed example of one implementation is described below.

Level-Based Selection

In another embodiment, the transform may be selected at the TU level (transform block level). For each TU using the adequate prediction mode, the selected transform may be signaled if there is any residue. Several transforms can be selected for each transform size. In one example, each transform size has the same number of possible transforms. In another example, only the luma blocks use the transform selection. In another example, blocks with different sizes use different numbers of transforms. For instance, larger blocks can use 4 or 8 transforms, since the signaling penalizes less for large blocks. On the other hand, smaller blocks (e.g., 4×4) use 2 possible transforms, or only 1, so no signaling is necessary for this size. The above transform selection methods for the TU level can also be applied to the CU level.

In another example, signaling is performed only for the first transform of a CU with a given size (and residue different than 0). Subsequently, it is assumed that the remaining TUs in the CU with that size use the same type of transform. In this way, each transform size in a TU can use its type of transform, and the signaling is reduced to a granularity between the CU and TU level.

Binarization

In some embodiments, the selection can be signaled using a variety of binarizations. In one example, a truncated unary code may be used. In another example, a fixed length code may be used. In another example, a most probable transform is assumed. For example, a first flag signals if the selected transform is the most probable one. If the flag is 0, it means that another transform is to be used, and further signaling may indicate the number of transforms to be used (typically, using one of the other binarization methods, such as unary or fixed length). For example, if five transforms are possible, then a first flag may indicate if the transform is the most probable transform (e.g., the DST of type III). If not, then two further bins may signal which one of the remaining four transforms is used. In addition, the coder can assume that there is more than one most probable transform, such as in the case of most probable mode (MPM) for intra prediction. In this case, the binarization is divided in two parts. The second part can use contexts (CABAC), or if higher throughput is desired, it can be coded using the bypass mode (which is faster than the regular CABAC mode).

If CABAC is used to code the bins, contexts may be assigned to each bin. The context selection depends on the TU size or depth, CU size or depth, and/or bin of the binarization. Additionally, if the binarization has a fixed length, the selected context can depend on the values of the previously coded bins of the binarization of the number of the selected transform.

The signaling can be performed for certain block sizes. For instance, signaling at the 4×4 level can be costly; therefore, the transform selection might be applied to transforms larger than 4×4.

Transform Example

In this example, a variation of Type 3 DST transform is used as follows:

```
4×4 Transform
const short g_aiS4[4][4] =
{
  {35,64,84,64},
  {84,64,-35,-64},
  {84,-64,-35,64},
  {35,-64,84,-64}
};
8×8 Transform
const short g_aiS8[8][8] =
{
  {18,35,50,64,75,84,89,64},
  {50,84,89,64,18,-35,-75,-64},
  {75,84,18,-64,-89,-35,50,64},
  {89,35,-75,-64,50,84,-18,-64},
  {89,-35,-75,64,50,-84,-18,64},
  {75,-84,18,64,-89,35,50,-64},
  {50,-84,89,-64,18,35,-75,64},
  {18,-35,50,-64,75,-84,89,-64}
};
16×16 Transform
const short g_aiS16[16][16] =
{
  {9,18,26,35,43,50,57,64,70,75,80,84,87,89,90,64},
  {26,50,70,84,90,89,80,64,43,18,-9,-35,-57,-75,-87,-64},
  {43,75,90,84,57,18,-26,-64,-87,-89,-70,-35,9,50,80,64},
  {57,89,80,35,-26,-75,-90,-64,-9,50,87,84,43,-18,-70,-64},
  {70,89,43,-35,-87,-75,-9,64,90,50,-26,-84,-80,-18,57,64},
  {80,75,-9,-84,-70,18,87,64,-26,-89,-57,35,90,50,-43,-64},
  {87,50,-57,-84,9,89,43,-64,-80,18,90,35,-70,-75,26,64},
  {90,18,-87,-35,80,50,-70,-64,57,75,-43,-84,26,89,-9,-64},
  {90,-18,-87,35,80,-50,-70,64,57,-75,-43,84,26,-89,-9,64},
  {87,-50,-57,84,9,-89,43,64,-80,-18,90,-35,-70,75,26,-64},
  {80,-75,-9,84,-70,-18,87,-64,-26,89,-57,-35,90,-50,-43,64},
  {70,-89,43,35,-87,75,-9,-64,90,-50,-26,84,-80,18,57,-64},
  {57,-89,80,-35,-26,75,-90,64,-9,-50,87,-84,43,18,-70,64},
  {43,-75,90,-84,57,-18,-26,64,-87,89,-70,35,9,-50,80,-64},
  {26,-50,70,-84,90,-89,80,-64,43,-18,-9,35,-57,75,-87,64},
  {9,-18,26,-35,43,-50,57,-64,70,-75,80,-84,87,-89,90,-64}
};
32×32 Transform
const short g_aiS32[32][32] =
{
{4,9,13,18,22,26,30,35,39,43,47,50,54,57,61,64,67,70,73,75,78,80,82,84,85,87,88,89,90,90,90,64},
{13,26,39,50,61,70,78,84,88,90,90,89,85,80,73,64,54,43,30,18,4,-9,-22,-35,-47,-57,-67,-75,-82,-87,-90,-64},
{22,43,61,75,85,90,90,84,73,57,39,18,-4,-26,-47,-64,-78,-87,-90,-89,-82,-70,-54,-35,-13,9,30,50,67,80,88,64},
{30,57,78,89,90,80,61,35,4,-26,-54,-75,-88,-90,-82,-64,-39,-9,22,50,73,87,90,84,67,43,13,-18,-47,-70,-85,-64},
{39,70,88,89,73,43,4,-35,-67,-87,-90,-75,-47,-9,30,64,85,90,78,50,13,-26,-61,-84,-90,-80,-54,-18,22,57,82,64},
{47,80,90,75,39,-9,-54,-84,-90,-70,-30,18,61,87,88,64,22,-26,-67,-89,-85,-57,-13,35,73,90,82,50,4,-43,-78,-64},
{54,87,85,50,-4,-57,-88,-84,-47,9,61,89,82,43,-13,-64,-90,-80,-39,18,67,90,78,35,-22,-70,-90,-75,-30,26,73,64},
{61,90,73,18,-47,-87,-82,-35,30,80,88,50,-13,-70,-90,-64,-4,57,90,75,22,-43,-85,-84,-39,26,78,89,54,-9,-67,-64},
{67,90,54,-18,-78,-87,-39,35,85,80,22,-50,-90,-70,-4,64,90,57,-13,-75,-88,-43,30,84,82,26,-47,-89,-73,-9,61,64},
{73,87,30,-50,-90,-57,22,84,78,-9,-67,-89,-39,43,90,64,-13,-80,-82,-26,54,90,50,-35,-88,-70,4,75,85,18,-57,-64},
{78,80,4,-75,-82,-9,73,84,13,-70,-85,-18,67,87,22,-64,-88,-26,61,89,30,-57,-90,-35,54,90,39,-50,-90,-43,47,64},
{82,70,-22,-89,-54,43,90,35,-61,-87,-13,75,78,-9,-85,-64,30,90,47,-50,-90,-26,67,84,4,-80,-73,18,88,57,-39,-64},
{85,57,-47,-89,-13,80,67,-35,-90,-26,73,75,-22,-90,-39,64,82,9,-88,-50,54,87,4,-84,-61,43,90,18,-78,-70,30,-64},
{88,43,-67,-75,30,90,13,-84,-54,57,82,-18,-90,-26,78,64,-47,-87,4,89,39,-70,-73,35,90,9,-85,-50,61,80,-22,-64},
{90,26,-82,-50,67,70,-47,-84,22,90,4,-89,-30,80,54,-64,-73,43,85,-18,-90,-9,88,35,-78,-57,61,75,-39,-87,13,-64},
{90,9,-90,-18,88,26,-85,-35,82,43,-78,-50,73,57,-67,-64,61,70,-54,-75,47,80,-39,-84,30,87,-22,-89,13,90,-4,-64},
{90,-9,-90,18,88,-26,-85,35,82,-43,-78,50,73,-57,-67,64,61,-70,-54,75,47,-80,-39,84,30,-87,-22,89,13,-90,-4,64},
{90,-26,-82,50,67,-70,-47,84,22,-90,4,89,-30,-80,54,64,-73,-43,85,18,-90,9,88,-35,-78,57,61,-75,-39,87,13,-64},
{88,-43,-67,75,30,-90,13,84,-54,-57,82,18,-90,26,78,-64,-47,87,4,-89,39,70,-73,-35,90,-9,-85,50,61,-80,-22,64},
{85,-57,-47,89,-13,-80,67,35,-90,26,73,-75,-22,90,-39,-64,82,-9,-88,50,54,-87,4,84,-61,-43,90,-18,-78,70,30,-64},
{82,-70,-22,89,-54,-43,90,-35,-61,87,-13,-75,78,9,-85,64,30,-90,47,50,-90,26,67,-84,4,80,-73,-18,88,-57,-39,64},
{78,-80,4,75,-82,9,73,-84,13,70,-85,18,67,-87,22,64,-88,26,61,-89,30,57,-90,35,54,-90,43,47,-90,50,-57,-64},
{73,-87,30,50,-90,57,22,-84,78,9,-67,89,-39,-43,90,-64,-13,80,-82,26,54,-90,50,35,-88,70,4,-75,85,-18,-57,64},
{67,-90,54,18,-78,87,-39,-35,85,-80,22,50,-90,70,-4,-64,90,-57,-13,75,-88,43,30,-84,82,-26,-47,89,-73,9,61,-64},
{61,-90,73,-18,-47,87,-82,35,30,-80,88,-50,-13,70,-90,64,-4,-57,90,-75,22,43,-85,84,-39,-26,78,-89,54,9,-67,64},
{54,-87,85,-50,-4,57,-88,84,-47,-9,61,-89,82,-43,-13,64,-90,80,-39,-18,67,-90,78,-35,-22,70,-90,75,-30,-26,73,-64},
{47,-80,90,-75,39,9,-54,84,-90,70,-30,-18,61,-87,88,-64,22,26,-67,89,-85,57,-13,-35,73,-90,82,-50,4,43,-78,64},
{39,-70,88,-89,73,-43,4,35,-67,87,-90,75,-47,9,30,-64,85,-90,78,-50,13,26,-61,84,-90,80,-54,18,22,-57,82,-64},
{30,-57,78,-89,90,-80,61,-35,4,26,-54,75,-88,90,-82,64,-39,9,22,-50,73,-87,90,-84,67,-43,13,18,-47,70,-85,64},
{22,-43,61,-75,85,-90,90,-84,73,-57,39,-18,-4,26,-47,64,-78,87,-90,89,-82,70,-54,35,-13,-9,30,-50,67,-80,88,-64},
{13,-26,39,-50,61,-70,78,-84,88,-90,90,-89,85,-80,73,-64,54,-43,30,-18,4,9,-22,35,-47,57,-67,75,-82,87,-90,64},
{4,-9,13,-18,22,-26,30,-35,39,-43,47,-50,54,-57,61,-64,67,-70,73,-75,78,-80,82,-84,85,-87,88,-89,90,-90,90,-64}
};
```

In this example, the above DST transform can be applied to Intra BL mode and GRP mode. For Intra BL mode, DST can be applied to all the transform sizes. For example, in HEVC, 4×4, 8×8, 16×16 and 32×32 transforms are allowed, and DST may also be applied to 4×4, 8×8, 16×16, 32×32 transform sizes. For GRP modes, DST is applied to only selected transform sizes, e.g., 4×4, 8×8 and 16×16 transforms. Furthermore, DST may be applied only when the base layer image has the highest weight in the prediction for generalized residue prediction mode. In one HEVC SVC extension codec, there are three different weight settings for GRP: weight index=0, 1, or 2. In this case, DST may only be applied to weight index=2.

Furthermore, in this example, DST can be selectively turned off based on QP difference between enhancement layer and base layer. For instance, let QPBL be QP of a base layer image and QPEL be QP of enhancement layer image. If QPBL−QPEL>=QP_Th, DCT is used. Otherwise, DST may be used if other conditions (Intra BL mode, transform size) defined earlier (above) are satisfied. In this example, QP_th is set to be 6 as prior (e.g., initial) knowledge to both the video encoder 20 and the video decoder 30 The QP value can be different for different mode, and also can be explicitly transmitted using some high level syntax.

Below is another detailed example where the selection of DST and DCT is explicitly signaled.

In this example, for each Intra BL CU with size larger than N×N, a flag is transmitted. If flag=1, DST is used. If flag=0, DCT is used. For IntrBL CU with other sizes, DST is always used. The flag is encoded using CABAC, and the CABAC context index=CU depth. Similarly, for each GRP CU, a flag is transmitted to indicate whether DST or DCT is used for the residues of this CU. The flag may be signaled for all GRP CUs or GRP CUs with non-zero weightings. When the flag is coded with CABAC, previously coded CU information may be used as context. Information of current CU, such as CU depth, may also be used as the context for the flag. When CU depth is used as context, the context may be used for the transform flag of both Intra BL CUs and GRP CUs. Alternatively, different contexts may be used for Intra BL CUs and GRP CUs.

Moreover, more than two transforms, such as DCT, DST, and training based KLT, may be used for CUs such as Intra BL CUs and GRP CUs. In this case, transform index is transmitted at CU level. The index may be transmitted for each CU or conditionally transmitted for CUs with certain types. In general, this feature (adaptive transform) may be enabled or disabled at a sequence level, picture level, slice level, or other levels. When the feature is disabled, only primary transform is used for all CUs.

Figure 8:
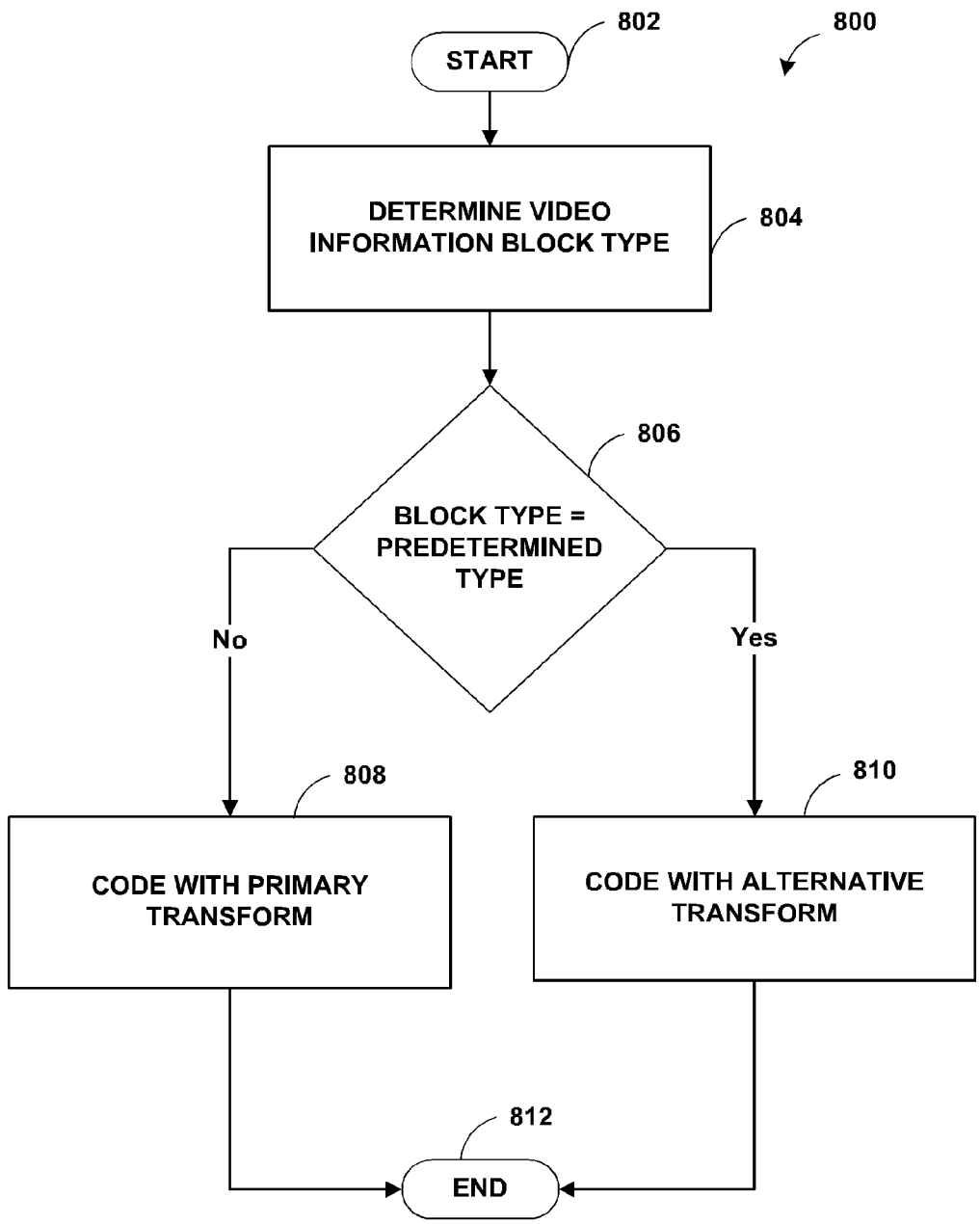
FIG. 8 is a flowchart illustrating an embodiment of a method for a coding routine according to aspects of this disclosure.

FIG. 8 is a flow chart illustrating one embodiment of a method of video coding. The method can be implemented by an encoder (e.g. video encoder 20 of FIG. 2) or decoder (e.g. video decoder 30 of FIG. 3), or any of the devices described above with respect to FIGS. 1-3. The method 800 begins at block 802. At block 804, a type of a block of video information is determined. For example, the type of coding used to code the block may be determined. In some embodiments, the type of block of video information refers to a neighboring region of a block in the enhancement layer. The type of block of video information may also refer to a neighboring region of a corresponding block in the base (or a reference) layer. At block 806, the method 800 determines whether the block type is of a predetermined type. For example, it may be determined whether the block type is Intra BL or GRP block coding.

If the block type is not of the predetermined type, the method 800 proceeds to block 808. If the block type is the predetermined type, the method 800 proceeds to block 810. At block 808, the video information is coded using a primary transform. For example, the video information may be coded using DCT. At block 810, the video information is coded using an alternative transform. For example, the video information may be coded using DST, a DST type (e.g., Type-I DST, Type-III DST, Type-IV DST, Type-VII DST), DCT, DCT of different types, KLT, etc. In some embodiments, at block 810, the method uses an adaptive transform technique, such as any of the adaptive techniques discussed above.

In some embodiments, the additional information includes a flag coded in the video information bitstream or other signal. The signal can occur at the frame level, slice level, CU level, TU level, or other level. In some embodiments the additional information includes side information, such as CU size, TU size, frame type, frame size, quantization parameter (QP), temporal layer information, parsed residue coefficients information, etc. In some embodiments, the additional information includes information from the base layer or both enhancement and base layers, as discussed above.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Various embodiments of the invention have been described. These and other embodiments are within the scope of the following claims.

What is claimed is:

1. An apparatus configured to code video information, the apparatus comprising:
   a memory configured to store video information associated with a reference layer and an enhancement layer, the enhancement layer comprising an enhancement layer block and the reference layer comprising a reference layer block corresponding to the enhancement layer block; and
   a processor operationally coupled to the memory and configured to:
      retrieve the video information from the memory;
      determine whether a difference between a region neighboring the enhancement layer block and a region neighboring the reference layer block is greater than a threshold level; and
      based on a determination that the difference is not greater than the threshold level, code the enhancement layer block using a discrete sine transform.

2. The apparatus of claim 1, wherein the processor is further configured to code the enhancement layer block using a transform selected based on whether the enhancement layer block is associated with a specific coding mode.

3. The apparatus of claim 2, wherein the specific coding mode comprises Intra BL mode or generalized residual prediction (GRP) mode.

4. The apparatus of claim 1, wherein the processor is further configured to:
   determine whether a coding mode associated with the enhancement layer block is one of Intra BL mode or generalized residual prediction GRP mode;
      based on a determination that the coding mode associated with the enhancement layer block is one of Intra BL mode or GRP mode, code the enhancement layer block using the discrete sine transform; and
      based on a determination that the coding mode associated with the enhancement layer block is not one of Intra BL mode or GRP mode, code the enhancement layer block using a discrete cosine transform.

5. The apparatus of claim 1, wherein the discrete sine transform comprises one of: a Type-I DST, a Type-III DST, a Type-IV DST, or a Type-VII DST.

6. The apparatus of claim 4, wherein the coding mode is signaled at one of: a frame level, a slice level, a coding unit level, or a transform unit level.

7. The apparatus of claim 1, wherein the processor is further configured to code the EL block using a transform selected based on at least one of: side information, a coding unit size, a transform unit size, a frame type, a frame size, a quantization parameter (QP), temporal layer information, or parsed residue coefficients information.

8. The apparatus of claim 1, wherein the processor is further configured to code the enhancement layer block using a discrete cosine transform based on a determination that the difference is greater than the threshold level.

9. The apparatus of claim 1, wherein the processor is configured to receive the threshold level using a high level syntax.

10. The apparatus of claim 1, wherein the use of the discrete sine transform is signaled using binarization.

11. The apparatus of claim 10, wherein the binarization comprises at least one of: a truncated unary code or a fixed length code.

12. The apparatus of claim 1, wherein the apparatus comprises an encoder.

13. The apparatus of claim 1, wherein the apparatus comprises a decoder.

14. The apparatus of claim 1, wherein the apparatus is selected from a group consisting of: a desktop computer, a notebook computer, a laptop computer, a tablet computer, a set-top box, a telephone handset, a smart phone, a smart pad, a television, a camera, a display device, a digital media player, a video gaming console, and a video streaming device.

15. A method of encoding video information, the method comprising:
   receiving video information associated with a reference layer and an enhancement layer, the enhancement layer comprising an enhancement layer block and the reference layer comprising a reference layer block corresponding to the enhancement layer block;
   determining whether a difference between a region neighboring the enhancement layer block and a region neighboring the reference layer block is greater than a threshold level; and
   performing one of: (i) based on a determination that the difference is not greater than the threshold level, encoding the enhancement layer block using a discrete sine transform, or (ii) based on a determination that the difference is greater than the threshold, encoding the enhancement layer block using a discrete cosine transform.

16. The method of claim 15, further comprising encoding the enhancement layer block using a transform selected based on whether the enhancement layer block is associated with a specific coding mode.

17. The method of claim 16, wherein the specific coding mode comprises Intra BL mode or generalized residual prediction (GRP) mode.

18. The method of claim 15, further comprising:
determining whether a coding mode associated with the enhancement layer block is one of Intra BL mode or generalized residual prediction GRP mode; and
performing one of: (i) based on a determination that the coding mode associated with the enhancement layer block is one of Intra BL mode or GRP mode, encoding the enhancement layer block using the discrete sine transform, or (ii) based on a determination that the coding mode associated with the enhancement layer block is not one of Intra BL mode or GRP mode, encoding the enhancement layer block using the discrete cosine transform.

19. The method of claim 15, wherein the discrete sine transform comprises one of: a Type-I DST, a Type-III DST, a Type-IV DST, or a Type-VII DST.

20. The method of claim 18, further comprising signaling the coding mode at one of: a frame level, a slice level, a coding unit level, or a transform unit level.

21. The method of claim 15, further comprising encoding the enhancement layer block using a transform selected based on at least one of: side information, a coding unit size, a transform unit size, a frame type, a frame size, a quantization parameter (QP), temporal layer information, or parsed residue coefficients information.

22. The method of claim 15, further comprising transmitting the threshold level using a high level syntax.

23. The method of claim 15, wherein the use of the discrete sine transform is signaled using binarization.

24. The method of claim 23, wherein the binarization comprises at least one of: a truncated unary code or a fixed length code.

25. A method of decoding video information, the method comprising:
receiving video information associated with a reference layer and an enhancement layer, the enhancement layer comprising an enhancement layer block and the reference layer comprising a reference layer block corresponding to the enhancement layer block;
determining whether a difference between a region neighboring the enhancement layer block and a region neighboring the reference layer block is greater than a threshold level; and
performing one of: (i) based on a determination that the difference is not greater than the threshold level, decoding the enhancement layer block using a discrete sine transform, or (ii) based on a determination that the difference is greater than the threshold, decoding the enhancement layer block using a discrete cosine transform.

26. The method of claim 25, further comprising decoding the enhancement layer block using a transform selected based on whether the enhancement layer block is associated with a specific coding mode.

27. The method of claim 26, wherein the specific coding mode comprises Intra BL mode or generalized residual prediction (GRP) mode.

28. The method of claim 25, further comprising:
determining whether a coding mode associated with the enhancement layer block is one of Intra BL mode or generalized residual prediction (GRP) mode; and
performing one of: (i) based on a determination that the coding mode associated with the enhancement layer block is one of Intra BL mode or GRP mode, decoding the enhancement layer block using the discrete sine transform, or (ii) based on a determination that the coding mode associated with the enhancement layer block is not one of Intra BL mode or GRP mode, decoding the enhancement layer block using the discrete cosine transform.

29. The method of claim 25, wherein the discrete sine transform comprises one of: a Type-I DST, a Type-III DST, a Type-IV DST, or a Type-VII DST.

30. The method of claim 28, further comprising processing the coding mode at one of: a frame level, a slice level, a coding unit level, or a transform unit level.

31. The method of claim 25, further comprising decoding the enhancement layer block using a transform selected based on at least one of: side information, a coding unit size, a transform unit size, a frame type, a frame size, a quantization parameter (QP), temporal layer information, or parsed residue coefficients information.

32. The method of claim 25, the threshold level is transmitted using a high level syntax.

33. The method of claim 25, wherein the use of the discrete sine transform is signaled using binarization.

34. The method of claim 33, wherein the binarization comprises at least one of: a truncated unary code or a fixed length code.

35. A video coding device configured to code video data, the video coding device comprising:
means for receiving video information associated with a reference layer and an enhancement layer, the enhancement layer comprising an enhancement layer block and the reference layer comprising a reference layer block corresponding to the enhancement layer block;
means for determining whether a difference between a region neighboring the enhancement layer block and a region neighboring the reference layer block is greater than a threshold level; and
means for coding, based on a determination that the difference is not greater than the threshold level, the enhancement layer block using a discrete sine transform.

36. The video coding device of claim 35, further comprising means for coding the enhancement layer block using a transform selected based on whether the enhancement layer is associated with Intra BL mode or generalized residual prediction (GRP) mode.

37. The video coding device of claim 35, further comprising:
means for determining whether a coding mode associated with the enhancement layer block is one of Intra BL mode or generalized residual prediction (GRP) mode;
means for coding, based on a determination that the coding mode associated with the enhancement layer block is one of Intra BL mode or GRP mode, the enhancement layer block using the discrete sine transform; and
means for coding, based on a determination that the coding mode associated with the enhancement layer block is not one of Intra BL mode or GRP mode, the enhancement layer block using a discrete cosine transform.

38. The video coding device of claim 35, wherein the discrete sine transform comprises one of: a Type-I DST, a Type-III DST, a Type-IV DST, or a Type-VII DST.

39. A non-transitory computer readable medium comprising code that, when executed, causes an apparatus to:
- receive video information associated with a reference layer and an enhancement layer, the enhancement layer comprising an enhancement layer block and the reference layer comprising a reference layer block corresponding to the enhancement layer block;
- determine whether a difference between a region neighboring the enhancement layer block and a region neighboring the reference layer block is greater than a threshold level; and
- based on a determination that the difference is not greater than the threshold level, code the enhancement layer block using a discrete sine transform.

40. The non-transitory computer readable medium of claim 39, wherein the code, when executed, further causes the apparatus to:
- determine whether a coding mode associated with the enhancement layer block is one of Intra BL mode or generalized residual prediction (GRP) mode;
- based on a determination that the coding mode associated with the enhancement layer block is one of Intra BL mode or GRP mode, code the enhancement layer block using the discrete sine transform; and
- based on a determination that the coding mode associated with the enhancement layer block is not one of Intra BL mode or GRP mode, code the enhancement layer block using a discrete cosine transform.

41. The non-transitory computer readable medium of claim 39, wherein the discrete sine transform comprises one of: a Type-I DST, a Type-III DST, a Type-IV DST, or a Type-VII DST.

42. The non-transitory computer readable medium of claim 39, wherein the use of the discrete sine transform is signaled using binarization.

* * * * *